(12) United States Patent
Park et al.

(10) Patent No.: US 9,189,105 B2
(45) Date of Patent: Nov. 17, 2015

(54) TOUCH SENSOR

(71) Applicant: SAMSUNG ELECTRO-MECHANICS CO., LTD., Suwon (KR)

(72) Inventors: Hee Jin Park, Suwon (KR); Ji Hyuk Lim, Suwon (KR); Seung Mi Lee, Suwon (KR); Suk Jin Ham, Suwon (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 111 days.

(21) Appl. No.: 13/831,704

(22) Filed: Mar. 15, 2013

(65) Prior Publication Data

US 2014/0176506 A1    Jun. 26, 2014

(30) Foreign Application Priority Data

Dec. 21, 2012  (KR) .................. 10-2012-0150923

(51) Int. Cl.
*G06F 3/042* (2006.01)
*G06F 3/041* (2006.01)
*H01H 1/10* (2006.01)
*G02F 1/1333* (2006.01)

(52) U.S. Cl.
CPC ............. *G06F 3/042* (2013.01); *G06F 3/041* (2013.01); *G02F 1/13338* (2013.01); *G06F 2203/04103* (2013.01)

(58) Field of Classification Search
CPC .......... G06F 3/041; G06F 2203/04103; G06F 3/042; G02F 1/13338
USPC ........................................... 345/176; 200/512
See application file for complete search history.

(56) References Cited

U.S. PATENT DOCUMENTS

| | | | | |
|---|---|---|---|---|
| 4,700,025 | A * | 10/1987 | Hatayama et al. ............. 200/5 A |
| 6,034,335 | A * | 3/2000 | Aufderheide ........ H01H 13/702 200/268 |
| 6,777,626 | B2 * | 8/2004 | Takabatake ........... G06F 1/1626 200/5 A |
| 2004/0090429 | A1 * | 5/2004 | Geaghan ............... G06F 3/0414 345/173 |
| 2005/0146516 | A1 * | 7/2005 | Nishiyama ..................... 345/176 |
| 2007/0085195 | A1 * | 4/2007 | Lee ..................... B81C 1/00301 257/704 |
| 2012/0247937 | A1 * | 10/2012 | Saito et al. ..................... 200/512 |
| 2013/0314648 | A1 * | 11/2013 | Rappoport et al. ............. 349/96 |

FOREIGN PATENT DOCUMENTS

KR      10-1127005      3/2012

* cited by examiner

*Primary Examiner* — Temesgh Ghebretinsae
*Assistant Examiner* — Benyam Ketema
(74) *Attorney, Agent, or Firm* — NSIP Law

(57) ABSTRACT

Disclosed herein is a touch sensor, including: a window; a transparent substrate having a first electrode part formed on one surface thereof; and a first adhesive layer allowing the window and one surface of the transparent substrate to adhere to each other, wherein a first protrusion part is formed on an edge of one surface of the transparent substrate.

18 Claims, 4 Drawing Sheets

TOUCH SENSOR

CROSS REFERENCE TO RELATED APPLICATION

This application claims the benefit of Korean Patent Application No. 10-2012-0150923, filed on Dec. 21, 2012, entitled "Touch Sensor", which is hereby incorporated by reference in its entirety into this application.

BACKGROUND OF THE INVENTION

1. Technical Field

The present invention relates to a touch sensor.

2. Description of the Related Art

Recently, with the development of computers using a digital technology, devices assisting computers have also been developed, and personal computers, portable transmitters and other personal information processors execute text and graphic processing using a variety of input devices such as a keyboard and a mouse.

While the rapid advancement of an information-oriented society has been widening the use of computers more and more, it is difficult to efficiently operate products using only a keyboard and mouse currently serving as an input device. Therefore, the need for a device that is simple, has minimum malfunction, and is capable of easily inputting information has increased.

In addition, current techniques for input devices have progressed toward techniques related to high reliability, durability, innovation, designing and processing beyond the level of satisfying general functions. To attain these objects, a touch panel has been developed as an input device capable of inputting information such as text, graphics, or the like.

The touch panel is mounted on the display surface of an image display device such as an electronic organizer, a flat panel display including a liquid crystal display device (LCD), a plasma display panel (PDP), an electroluminescence (El) element or the like, or a cathode ray tube (CRT), so that a user selects the desired information while viewing the image display device.

The touch panel is classified into a resistive type touch panel, a capacitive type touch panel, an electromagnetic type touch panel, a surface acoustic wave (SAW) type touch panel, and an infrared type touch panel. These various types of touch panels are adapted for electronic products in consideration of signal amplification problems, resolution difference, level of difficulty of designing and processing technologies, optical characteristics, electrical characteristics, mechanical characteristics, environment-resistant characteristics, input characteristics, durability, and economic efficiency. Currently, a capacitive type touch panel and a resistive type touch panel have been used in a wide range of fields.

Moisture has an important effect on reliability in electronic materials of polymer devices, and affects characteristics of materials, such as, changing electric characteristics of devices due to the change in mechanical physical properties, or the like. However, as a touch screen module according to the prior art is exposed to a high-temperature and high-humidity environment, defects or faults in electric connection may occur.

In particular, temperature and moisture environments may deteriorate conductive properties of materials in conductive polymer devices such as a touch screen panel and the like. However, nevertheless the effects of this moisture on material characteristics is currently important, countermeasures therefor are insufficient.

PRIOR ART DOCUMENT

Patent Document (Patent Document 1) Korean Patent No. 10-1127005

SUMMARY OF THE INVENTION

The present invention has been made in an effort to provide a touch sensor and a method for manufacturing the same, capable of preventing and reducing defects or faults in electric connection from the external environment such as moisture and the like.

According to a preferred embodiment of the present invention, there is provided a touch sensor, including: a window; a transparent substrate having a first electrode part formed on one surface thereof; and a first adhesive layer allowing the window and one surface of the transparent substrate to adhere to each other, wherein a first protrusion part is formed on an edge of one surface of the transparent substrate.

Here, a second protrusion part may be formed on an edge of one surface of the window correspondingly to the first protrusion part of the transparent substrate.

The first protrusion part and the second protrusion part may be formed on respective four corners of the transparent substrate and the window, respectively.

The first protrusion part and the second protrusion part each may have a square column shape.

The first protrusion part and the second protrusion part may be formed along respective edges of the transparent substrate and the window, respectively.

The first adhesive layer may be formed of an optically clear adhesive (OCA).

The transparent substrate may be formed of glass or film.

Here, when space between the transparent substrate and the window is designated by t1, and width of the first protrusion part or the second protrusion part is designated by w1, a conditional expression of $w1/t1 \geq 3$ may be satisfied.

Here, a space between the first protrusion part and the second protrusion part may be 50 μor smaller.

The touch sensor may further include a first insulating layer formed on one surface of the transparent substrate to cover the first electrode part.

The touch sensor may further include: a transparent member; and a second adhesive layer allowing one surface of the transparent member and the other surface of the transparent substrate to each other, a second electrode part being formed on the other surface of the transparent substrate, wherein a third protrusion part is formed along an edge of the other surface of the transparent substrate.

Here, a fourth protrusion part may be formed on an edge of one surface of the transparent member correspondingly to the third protrusion part of the transparent substrate.

The third protrusion part and the fourth protrusion part may be formed on respective four corners of the transparent substrate and the transparent member, respectively.

The third protrusion part and the fourth protrusion part each may have a square column shape.

The third protrusion part and the fourth protrusion part may be formed along respective edges of the transparent substrate and the transparent member, respectively.

The second adhesive layer may be formed of an optically clear adhesive (OCA).

Here, when space between the transparent member and the transparent substrate is designated by t2, and width of the third protrusion part or the fourth protrusion part is designated by w2, a conditional expression of $w2/t2 \geq 3$ may be satisfied.

Here, a space between the third protrusion part and the fourth protrusion part may be 50 μor smaller.

The touch sensor may further include a second insulating layer formed on the other surface of the transparent substrate to cover the second electrode part.

BRIEF DESCRIPTION OF THE DRAWINGS

The above and other objects, features, and advantages of the present invention will be more clearly understood from the following detailed description taken in conjunction with the accompanying drawings, in which.

DESCRIPTION OF THE PREFERRED EMBODIMENTS

Figure 1:
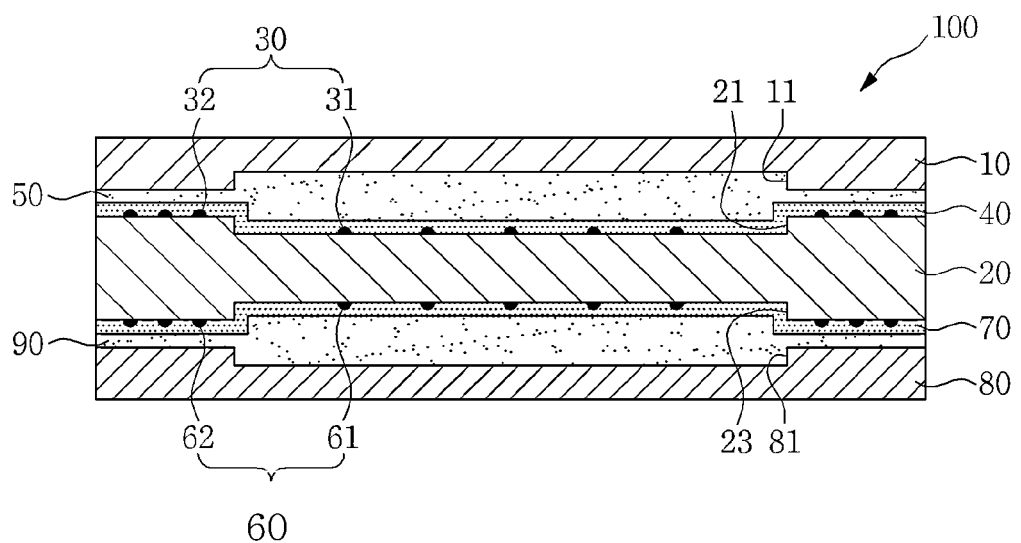
FIG. 1 is a side cross-sectional view of a touch sensor according to one preferred embodiment of the present invention.

The objects, features and advantages of the present invention will be more clearly understood from the following detailed description of the preferred embodiments taken in conjunction with the accompanying drawings. Throughout the accompanying drawings, the same reference numerals are used to designate the same or similar components, and redundant descriptions thereof are omitted. Further, in the following description, the terms "first", "second", "one side", "the other side" and the like are used to differentiate a certain component from other components, but the configuration of such components should not be construed to be limited by the terms. Further, in the description of the present invention, when it is determined that the detailed description of the related art would obscure the gist of the present invention, the description thereof will be omitted.

Hereinafter, preferred embodiments of the present invention will be described in detail with reference to the attached drawings.

FIG. 1 is a side cross-sectional view of a touch sensor according to one preferred embodiment of the present invention.

Referring to FIG. 1, a touch sensor 100 according to one preferred embodiment of the present invention may include a window 10, a transparent substrate 20, and a first adhesive layer 50.

In addition, the touch sensor 100 according to one preferred embodiment of the present invention may further include a transparent member 80 and a second adhesive layer 90.

Hereinafter, referring to FIGS. 1 to 4, the touch sensor 100 according to one preferred embodiment of the present invention will be described in more detail.

Referring to FIG. 1, the transparent substrate 20 serves to provide regions in which a first electrode part 30 and a second electrode part 60 are to be formed. Here, the transparent substrate 20 needs to have a support force by which the first and second electrode parts 30 and 60 can be supported and transparency by which an image supplied from an image display device (not shown) can be recognized by a user. In consideration of the foregoing support force and transparency, the transparent substrate 20 may be preferably formed of polyethyleneterephthalate (PET), polycarbonate (PC), polymethylmethacrylate (PMMA), polyethylenenaphthalate (PEN), polyethersulfone (PES), cyclic olefin copolymer (COC), a triacetylcellulose (TAC) film, a polyvinyl alcohol (PVA) film, a polyimide (PI) film, polystyrene (PS), biaxially oriented polystyrene (BOPS; containing K resin), glass or reinforced glass, or the like, but is not necessarily limited thereto.

In addition, the transparent substrate 20 has a first protrusion part 21 and a third protrusion part 23 formed on respective edges of both surfaces thereof, respectively. Here, the first protrusion part 21 is protruded from the edge of one surface of the transparent substrate 20 toward a direction facing the window 10, to thereby narrow a space between an edge of one surface of the window 10 and the edge of one surface of the transparent substrate 20. Due to this, the permeation rate of moisture externally permeating between the window 10 and one surface of the transparent substrate 20 can be significantly reduced.

In addition, the third protrusion part 23 is protruded from the edge of the other surface of the transparent substrate 20 toward a direction facing the transparent member 80, to thereby narrow a space between the transparent member 80 and the other surface of the transparent substrate 20. Due to this, the permeation rate of moisture externally permeating between the transparent member 80 and the other surface of the transparent substrate 20 can be significantly reduced.

Meanwhile, referring to FIGS, 2A and 2B, as one example, the first protrusion part 21 and the third protrusion part 23 of the transparent substrate 20 may be formed at four corners of one surface and the other surface of the transparent substrate 20, respectively. Here, the first protrusion part 21 and the third protrusion part 23 respectively formed at the four corners of the one surface and the other surface of the transparent substrate 20 may have a square column shape.

Figure 3:
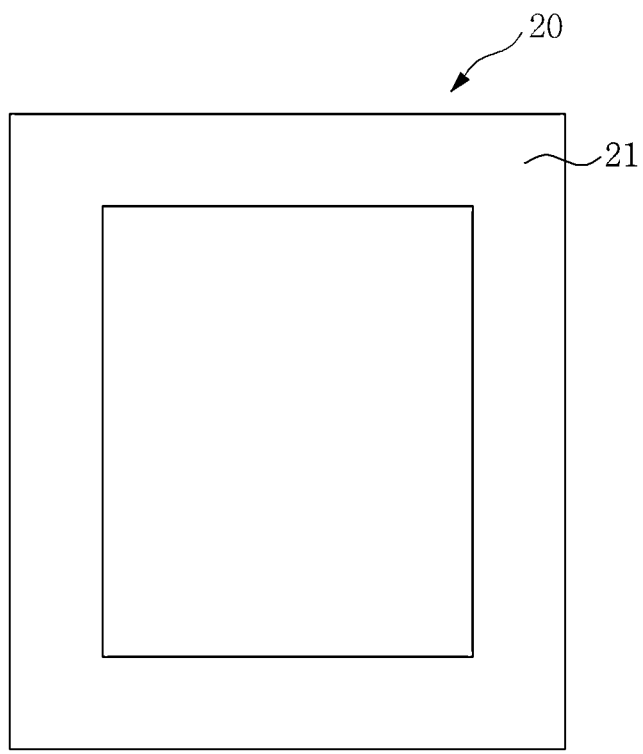
FIG. 3 is a plane view showing another example of a transparent substrate in the touch sensor according to one preferred embodiment of the present invention.

In addition, referring to FIG. 3, as another example, the first protrusion part 21 and the third protrusion part 23 of the transparent substrate 20 according to one preferred embodiment of the present invention may be formed along the edge of one surface and the other surface each of the transparent substrate 20. Here, the first protrusion part 21 and the third protrusion part 23 each may have, for example, a square column shape having a square hole formed in a center portion thereof or a square loop shape, but the present invention is not limited thereto, and may be formed in various shapes having protruded steps.

Figure 2A:
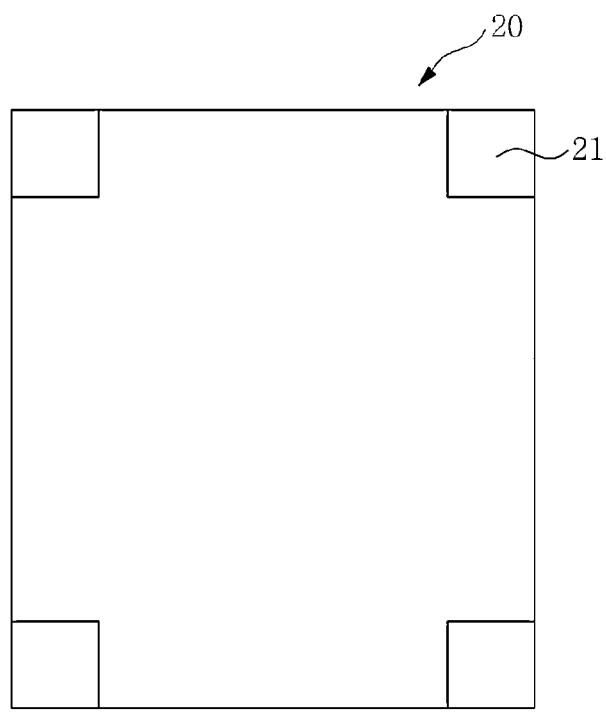
FIGS. 2A and 2B are a top view and a bottom view, respectively, showing one example of a transparent substrate in the touch sensor according to one preferred embodiment of the present invention.
Figure 2B:
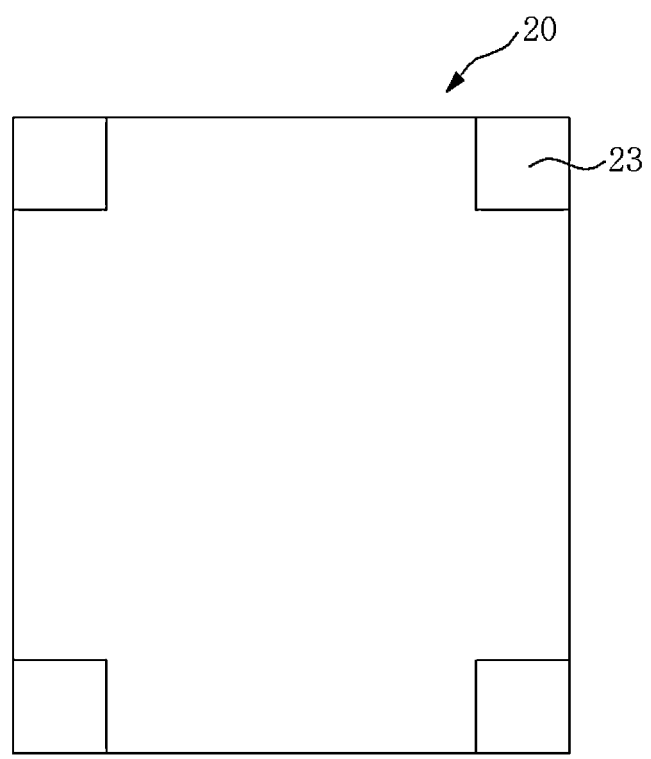

Referring to FIGS. 1 to 3, the window 10 is formed of glass or reinforced glass, and positioned at the outermost region of the touch sensor 100 of the present invention. Here, the window 10 may have a second protrusion part 11 formed on an edge of one surface thereof and corresponding to the first protrusion part 21 of the transparent substrate 20. Here, the second protrusion part 11 is protruded from the edge of one surface of the window 10, which face the transparent substrate 20, toward a direction facing the transparent substrate 20, to thereby narrow a space between the edge of one surface of the window 10 and the edge of one surface of the transparent substrate 20. Due to this, the permeation rate of moisture externally permeating between the window 10 and one surface of the transparent substrate 20 can be further significantly reduced. Eventually, this structure can prevent conductive properties of the first electrode part 30 from being deteriorated due to the moisture and prevent and significantly reduce defects or faults in electric connection.

Meanwhile, in the touch sensor 100 according to one preferred embodiment of the present invention, the second protrusion part 11 is formed correspondingly to the first protrusion part 21, but the present invention is not limited thereto. The first protrusion part 21 and the second protrusion part 11 may of course have different lengths and widths.

Referring to FIG. 1, the first electrode part 30 may be formed on one surface of the transparent substrate 20. Here, since one surface of the transparent substrate 20 includes the first protrusion part 21, the first electrode part 30 may be formed up to one surface of the first protrusion part 21.

Here, one surface of the transparent substrate 20 may indicate an upper surface of the transparent substrate 20 in FIG. 1, but one surface of the transparent substrate 20 of the present invention is not limited to the upper surface of the transparent substrate 20, and one surface of the transparent substrate 20 maybe, of course, a lower surface of the transparent substrate 20.

In addition, the first electrode part 30 includes first electrodes 31 formed in an active area of the transparent substrate 20 and first electrode wires 32 formed in a non-active area. Here, the first electrode wires 32 are connected with borders of the first electrodes 31 to receive electric signal from the first electrodes 31.

Figure 4:
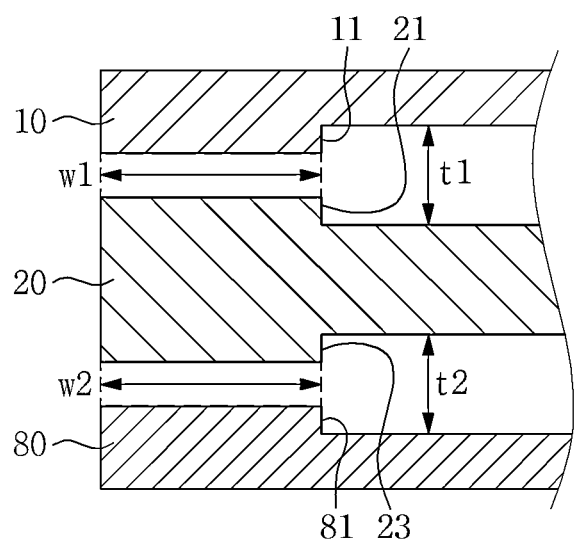
FIG. 4 is an exemplified view of the touch sensor according to one preferred embodiment of the present invention.

Meanwhile, referring to FIG. 4, in the touch sensor 100 according to one preferred embodiment of the present invention, when space between the transparent substrate 20 and the window 10 is designated by t1 and width of the first protrusion part 21 or the second protrusion part 11 is designated by w1, a conditional expression of w1/t1>3 may be satisfied.

Here, the space between the first protrusion part 21 and the second protrusion part 11 may be ⅔ or smaller the space between the transparent substrate 20 and the window 10, t1.

Here, the space between the first protrusion part 21 and the second protrusion part 11 may be 50 μm or smaller.

Referring to FIG. 1, the first adhesive layer 50 allows one surface of the window 10 and one surface of the transparent substrate 20 to adhere to each other. Here, the first adhesive layer 50 may be formed of optically clear adhesive (OCA), but the present invention is not necessarily limited thereto.

Meanwhile, the touch sensor 100 according to one preferred embodiment of the present invention may further include a first insulating layer 40 formed on one surface of the transparent substrate 20 to cover the first electrode part 30.

Here, the first insulating layer 40 may be formed of an inorganic material. Here, the inorganic material may be silicon dioxide (SiO$_2$) or silicon alkoxide, but a material for the first insulating layer 40 according to one preferred embodiment of the present invention is not necessarily limited thereto.

The transparent member 80 may have a fourth protrusion part 81 formed on an edge of one surface thereof and corresponding to the third protrusion part 23 of the transparent substrate 20. Here, the fourth protrusion part 81 is protruded from the edge of one surface of the transparent member 80, which face the transparent substrate 20, toward a direction facing the transparent substrate 20, to thereby narrow a space between the edge of one surface of the transparent member 80 and the edge of the other surface of the transparent substrate 20. Due to this, the permeation rate of moisture externally permeating between the transparent member 80 and the other surface of the transparent substrate 20 can be further significantly reduced. Eventually, this structure can prevent conductive properties of the second electrode part 60 from being deteriorated due to the moisture and prevent and significantly reduce defects or faults in electric connection.

Meanwhile, in the touch sensor 100 according to one preferred embodiment of the present invention, the fourth protrusion part 81 is formed correspondingly to the second protrusion part 11, but the present invention is not limited thereto. The second protrusion part 11 and the fourth protrusion part 81 may of course have different lengths and widths.

In addition, the transparent member 80 may be made of a film, but the present invention is not limited thereto, and may be made of an insulating layer or a resin layer.

Meanwhile, referring to FIG. 4, in the touch sensor 100 according to one preferred embodiment of the present invention, when space between the transparent substrate 20 and the transparent member 80 is designated by t2 and width of the third protrusion part 23 or the fourth protrusion part 81 is designated by w2, a conditional expression of $w2/t2 \geq 3$ may be satisfied.

Here, the space between the third protrusion part 23 and the fourth protrusion part 81 may be ⅔ or smaller the space between the transparent substrate 20 and the transparent member 80, t2.

Here, the space between the third protrusion part 23 and the fourth protrusion part 81 may be 50 μm or smaller.

Referring to FIG. 1, the second adhesive layer 90 allows one surface of the transparent member 80 and the other surface of the transparent substrate 20 to adhere to each other. Here, the second adhesive layer 90 may be formed of optically clear adhesive (OCA), but the present invention is not necessarily limited thereto.

Meanwhile, the touch sensor 100 according to one preferred embodiment of the present invention may further include a second insulating layer 70 formed on the other surface of the transparent substrate 20 to cover the second electrode part 60.

Here, the second insulating layer 70 may be formed of an inorganic material. Here, the inorganic material may be silicon dioxide (SiO$_2$) or silicon alkoxide, but a material for the second insulating layer 70 according to one preferred embodiment of the present invention is not necessarily limited thereto.

Referring to FIG. 1, the second electrode part 60 may be formed on the other surface of the transparent substrate 20. Here, since the other surface of the transparent substrate 20 includes the third protrusion part 23, the second electrode part 60 may be formed up to one surface of the third protrusion part 23.

Here, the other surface of the transparent substrate 20 may indicate the lower surface of the transparent substrate 20 in FIG. 1, but the other surface of the transparent substrate 20 of the present invention is not limited to the lower surface of the transparent substrate 20, and the other surface of the transparent substrate 20 may be, of course, the upper surface of the transparent substrate 20.

In addition, the second electrode part 60 includes second electrodes 61 formed in the active area of the transparent substrate 20 and second electrode wires 62 formed in the non-active area. Here, the second electrode wires 62 are connected with borders of the second electrodes 61 to receive an electric signal from the second electrodes 61.

Meanwhile, the first electrodes 31 and the second electrodes 61 of the touch sensor 100 according to one preferred embodiment of the present invention may be formed of any one of metal mesh, metal oxide, or conductive polymer, but the present invention is not limited thereto.

Here, the metal mesh may be formed in a mesh pattern by using copper (Cu), aluminum (Al), gold (Au), silver (Ag), titanium (Ti), palladium (Pd), chrome (Cr), or a combination thereof.

Meanwhile, in a case where the first electrodes 31 and the second electrodes 61 are formed of copper (Cu), a blackened treatment is performed on surfaces of the first electrodes 31 and the second electrodes 61, thereby preventing reflection of light.

Here, examples of the conductive polymer may include poly-3, 4-ethylenedioxythiophene/polystyrenesulfonate (PEDOT/PSS), polyaniline, polyacetylene, or polyphenylenevinylene.

Here, the first electrodes 31 and the second electrodes 61 may be formed by a drying process, a wetting process, or a direct patterning process. Here, the drying process means sputtering, evaporation, or the like, the wetting process means dip coating, spin coating, roll coating, spray coating, or the like, the direct patterning process means screen printing, gravure printing, inkjet printing, or the like.

In addition, examples of the metal oxide may include indium-tin oxide.

Meanwhile, the electrodes may be formed of metal silver formed by exposing/developing a silver salt emulsion layer, besides the above-described metal.

Figure 5:
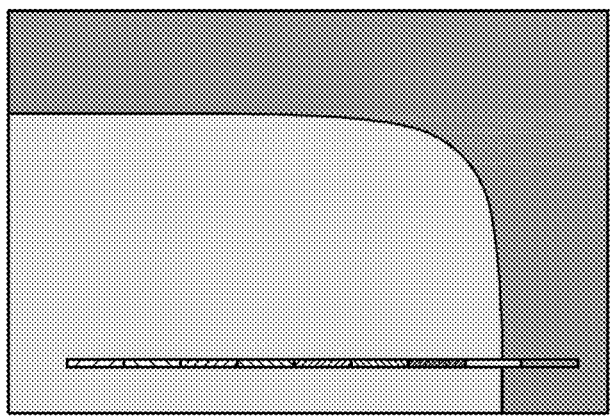
FIG. 5 is a graph showing a moisture diffusion degree in a touch panel according to prior art.
Figure 6:
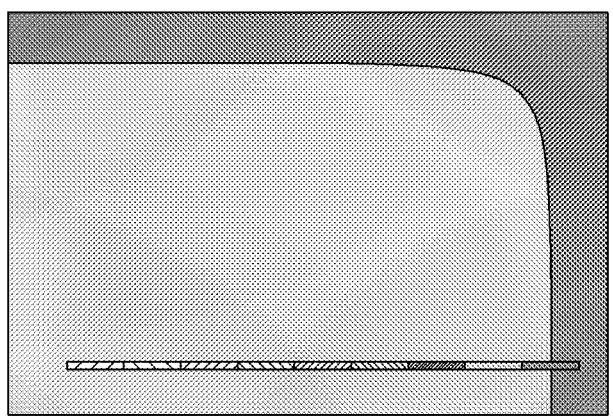
FIG. 6 is a graph showing a moisture diffusion degree in the touch panel according to one preferred embodiment of the present invention.

FIG. 5 is a graph showing a moisture diffusion degree in a touch panel according to prior art; and FIG. 6 is a graph showing a moisture diffusion degree in the touch panel according to one preferred embodiment of the present invention. Here, FIGS. 5 and 6 show the diffusion degree of moisture permeating into each of the touch panels after 3 hours under the conditions of a temperature of 85° C. and humidity of 85% RH, using a color type.

It may be seen that moisture diffusion was further significantly reduced in the touch panel according to one embodiment of the present invention shown in FIG. 6 than in the touch panel according to the prior art shown in FIG. 5.

More specifically, FIGS. 5 and 6 showed that moisture diffusion after three hours gradually progressed through the corners of the touch panel, and in addition, displayed colors indicated the degree at which the distribution of saturated moisture was developed. The amount of moisture was normalized to relative humidity. Dark color indicates 0.85, which represents a saturation state of 85% RH. Here, it may be seen that the distribution of saturated moisture through diffusion of Dark color was less significantly developed as time goes in the touch panel according to one preferred embodiment of the present invention shown in FIG. 6 than in the touch panel according to the prior art shown in FIG. 5. Therefore, deterioration in electric function of the touch panel due to moisture can be prevented and thus the lifespan can be increased.

As set forth above, according to the present invention, the permeation of moisture can be prevented or significantly reduced and thus defects or faults in electric connection can be prevented and reduced. Further, the deterioration in conductive properties of material in the conductive polymer devices can be prevented.

Although the embodiments of the present invention have been disclosed for illustrative purposes, it will be appreciated that the present invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. A touch sensor, comprising:
   a window;
   a transparent member:
   a transparent substrate having a first electrode part formed on one surface thereof; and
   a first adhesive layer allowing the window and one surface of the transparent substrate to adhere to each other,
   wherein a first protrusion part is protruded from an edge of one surface of the transparent substrate toward a direction facing the window;
   a second adhesive layer allowing one surface of the transparent member and the other surface of the transparent substrate to each other, a second electrode part being formed on the other surface of the transparent substrate,
   wherein a third protrusion part is formed along an edge of the other surface of the transparent substrate.

2. The touch sensor as set forth in claim 1, wherein a second protrusion part is formed on an edge of one surface of the window correspondingly to the first protrusion part of the transparent substrate.

3. The touch sensor as set forth in claim 2, wherein the first protrusion part and the second protrusion part are formed on respective four corners of the transparent substrate and the window, respectively.

4. The touch sensor as set forth in claim 3, wherein the first protrusion part and the second protrusion part each have a square column shape.

5. The touch sensor as set forth in claim 2, wherein the first protrusion part and the second protrusion part are formed along respective edges of the transparent substrate and the window, respectively.

6. The touch sensor as set forth in claim 1, wherein the first adhesive layer is formed of an optically clear adhesive (OCA).

7. The touch sensor as set forth in claim 1, wherein the transparent substrate is formed of glass or film.

8. The touch sensor as set forth in claim 2, wherein, when space between the transparent substrate and the window is designated by t1, and width of the first protrusion part or the second protrusion part is designated by w1, a conditional expression of $w1/t1 \geq 3$ is satisfied.

9. The touch sensor as set forth in claim 8, wherein a space between the first protrusion part and the second protrusion part is 50 μm or smaller.

10. The touch sensor as set forth in claim 1, further comprising a first insulating layer formed on one surface of the transparent substrate to cover the first electrode part.

11. The touch sensor as set forth in claim 1, wherein a fourth protrusion part is formed on an edge of one surface of the transparent member correspondingly to the third protrusion part of the transparent substrate.

12. The touch sensor as set forth in claim 11, wherein the third protrusion part and the fourth protrusion part are formed on respective four corners of the transparent substrate and the transparent member, respectively.

13. The touch sensor as set forth in claim 12, wherein the third protrusion part and the fourth protrusion part each have a square column shape.

14. The touch sensor as set forth in claim 11, wherein the third protrusion part and the fourth protrusion part are formed along respective edges of the transparent substrate and the transparent member, respectively.

15. The touch sensor as set forth in claim 1, wherein the second adhesive layer is formed of an optically clear adhesive (OCA).

16. The touch sensor as set forth in claim 11, wherein, when space between the transparent member and the transparent substrate is designated by t2, and width of the third protrusion part or the fourth protrusion part is designated by w2, a conditional expression of w2/t2≥3 is satisfied.

17. The touch sensor as set forth in claim 16, wherein a space between the third protrusion part and the fourth protrusion part is 50μm or smaller.

18. The touch sensor as set forth in claim 1, further comprising a second insulating layer formed on the other surface of the transparent substrate to cover the second electrode part.

* * * * *